United States Patent [19]
Zorn et al.

[11] Patent Number: 4,594,876
[45] Date of Patent: Jun. 17, 1986

[54] APPARATUS FOR FORMING THE STITCH FORMING AREA OF A SEWING MACHINE THROAT PLATE

[75] Inventors: Robert Zorn; David Dispennett, both of Chicago, Ill.

[73] Assignee: Union Special Corporation, Chicago, Ill.

[21] Appl. No.: 616,512

[22] Filed: Jun. 1, 1984

Related U.S. Application Data

[60] Continuation-in-part of Ser. No. 557,713, Dec. 2, 1983, abandoned, which is a division of Ser. No. 315,335, Oct. 26, 1981, Pat. No. 4,430,878.

[51] Int. Cl.[4] .................. B21D 11/22; B21D 43/26
[52] U.S. Cl. .......................... 72/414; 72/421; 72/465
[58] Field of Search ............... 72/324, 340, 414, 412, 72/359, 358, 361, 352, 481, 379, 341, 456, 420, 421, 461

[56] References Cited

U.S. PATENT DOCUMENTS

| | | | |
|---|---|---|---|
| 155,128 | 9/1874 | Ward | 72/359 |
| 226,051 | 3/1880 | Ells | 72/414 |
| 1,863,729 | 6/1932 | Rafter | 72/481 |
| 2,066,372 | 1/1937 | Tomalis . | |
| 2,096,387 | 10/1937 | Tinnerman | 72/358 |
| 2,102,572 | 12/1937 | Minkel | 72/359 |
| 2,306,658 | 12/1942 | Willard | 72/358 |
| 2,958,362 | 11/1960 | Creek | 72/456 |
| 2,964,003 | 12/1960 | Carper | 72/421 |
| 3,310,973 | 3/1967 | Leis | 72/461 |
| 4,044,814 | 8/1977 | Zocher | 163/5 |
| 4,420,962 | 12/1983 | Peterson | 72/414 |

FOREIGN PATENT DOCUMENTS

| | | | |
|---|---|---|---|
| 579128 | 6/1933 | Fed. Rep. of Germany | 72/412 |
| 1292110 | 4/1969 | Fed. Rep. of Germany | 72/358 |
| 1463284 | 12/1966 | France | 72/359 |
| 103565 | 3/1924 | Switzerland | 72/358 |
| 380062 | 9/1964 | Switzerland | 72/414 |

*Primary Examiner*—Daniel C. Crane
*Attorney, Agent, or Firm*—John A. Schaerli

[57] ABSTRACT

This invention relates to a cold forming process wherein a consistent stitch tongue profile is swaged into a planar throat plate blank. Thereafter, excess material resulting from the cold forming process is removed and the required needle holes and thread slots are provided in the blank.

1 Claim, 27 Drawing Figures

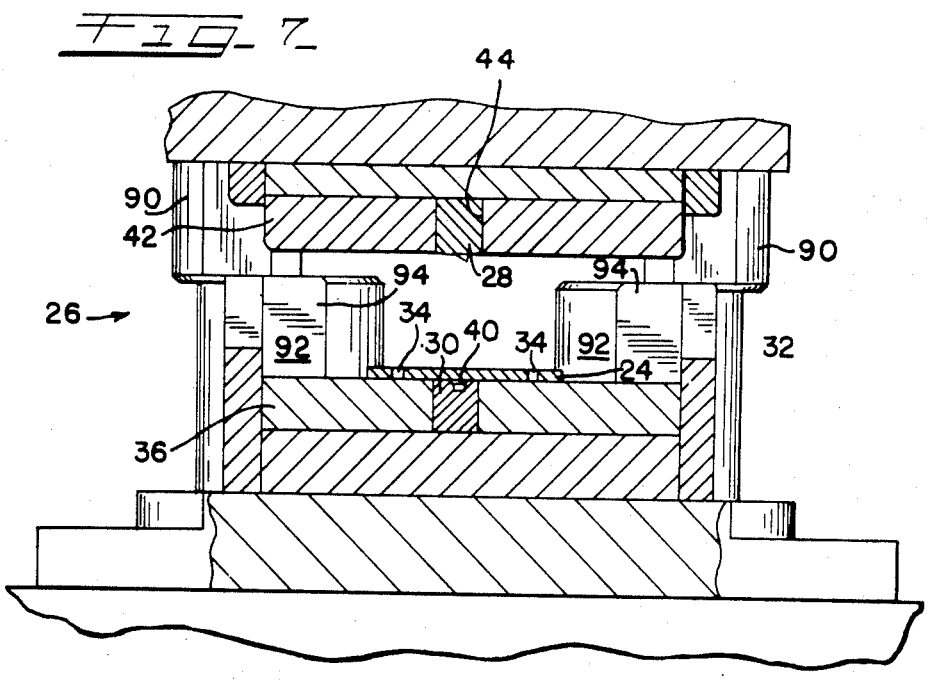
FIG_7_
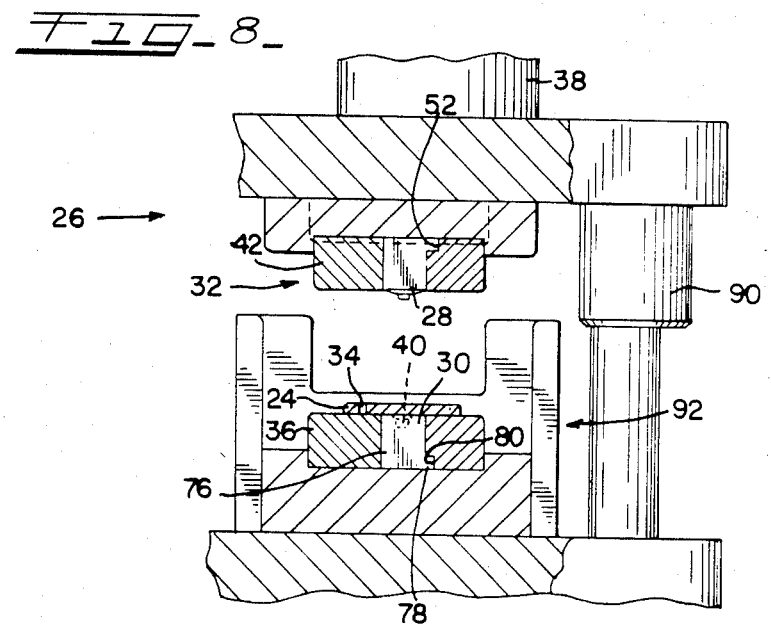
FIG_8_

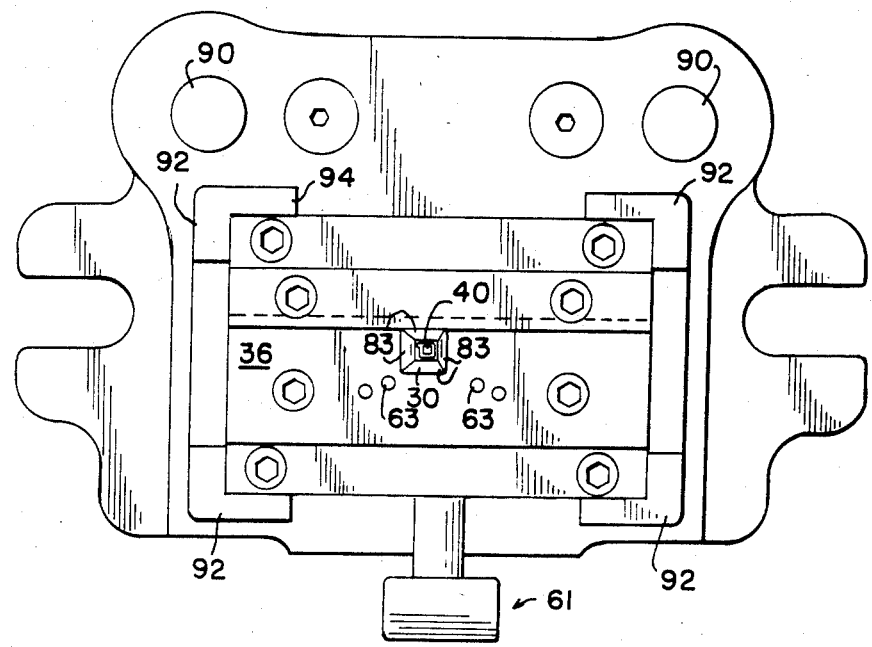
FIG_9_
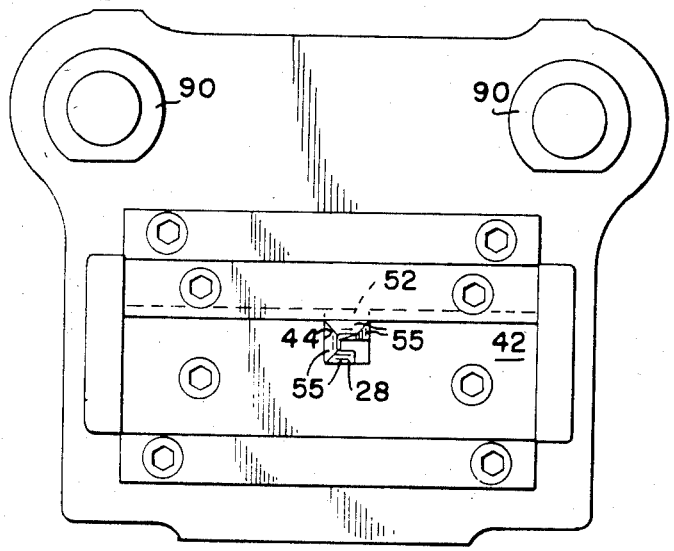
FIG_10_

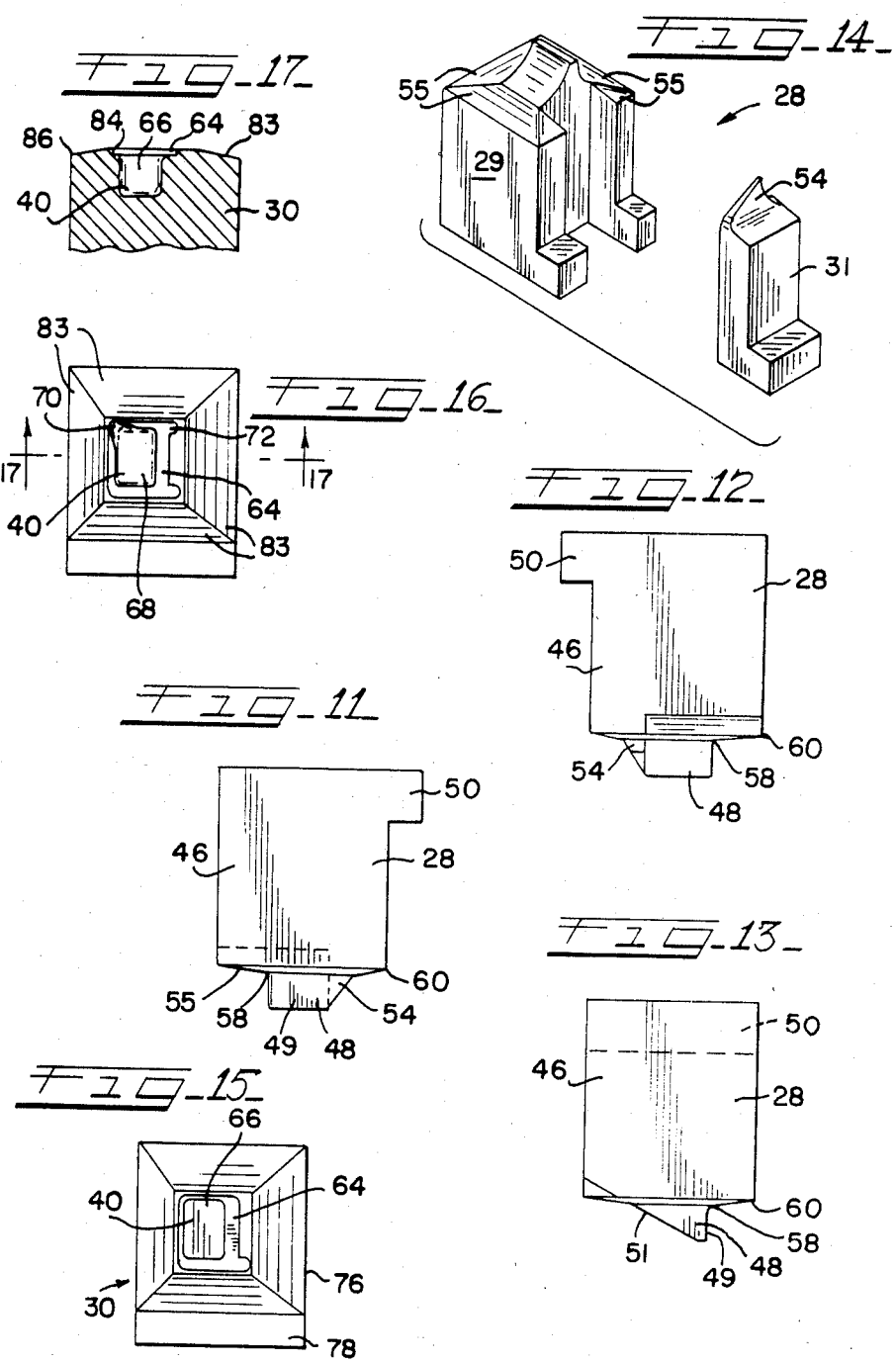

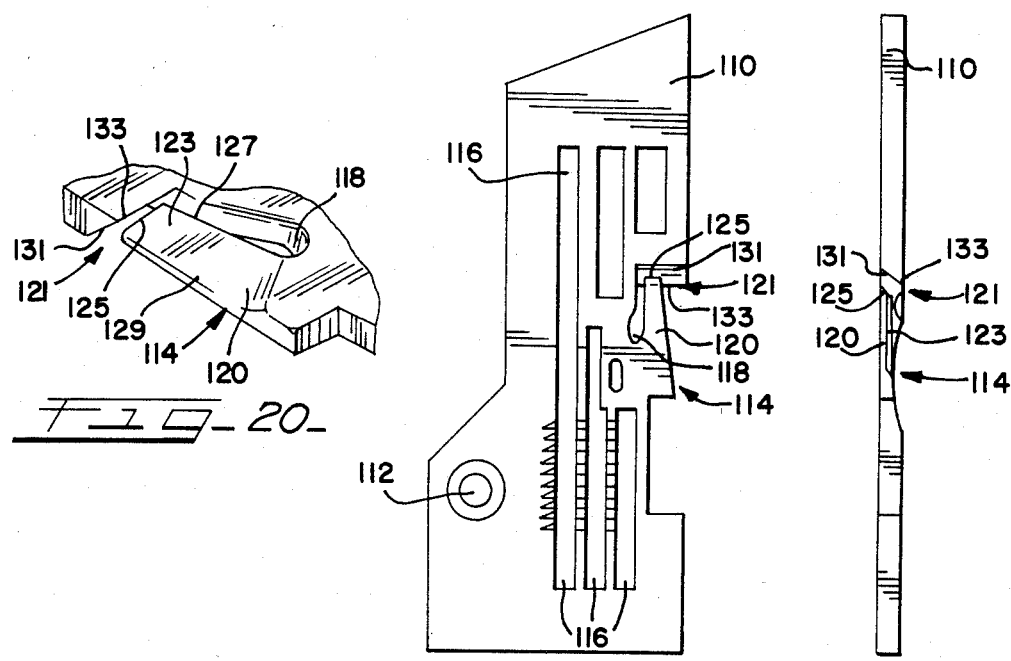
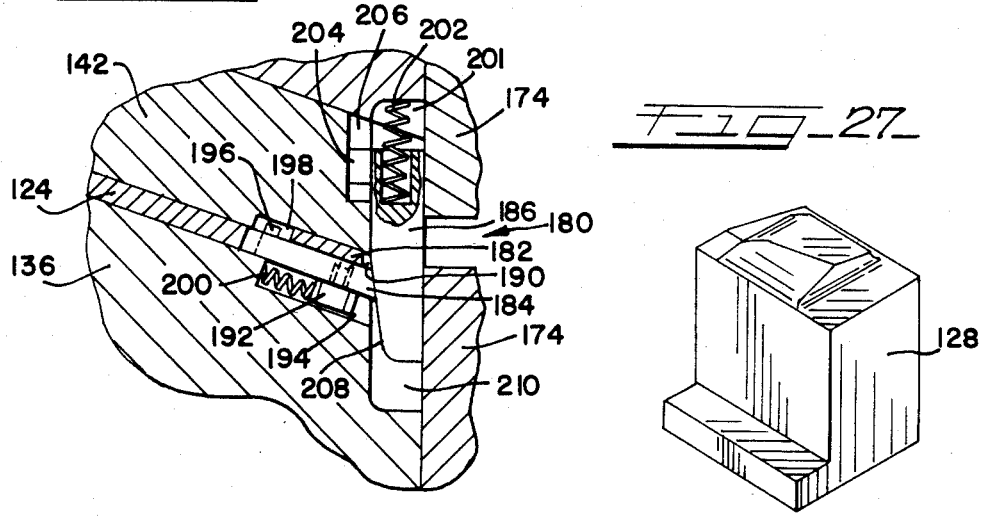

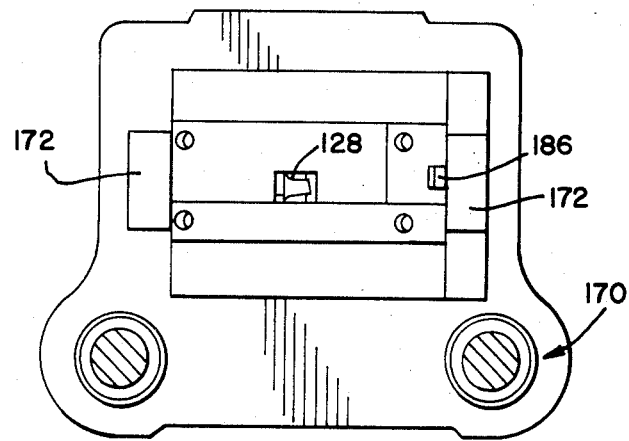
FIG_23_
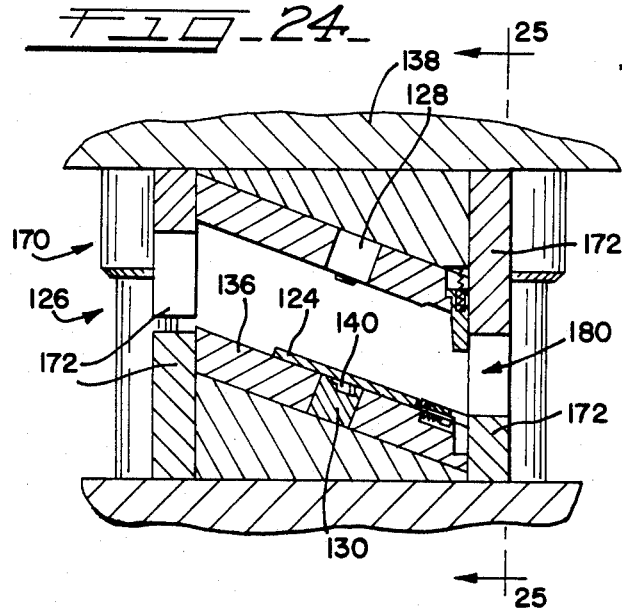
FIG_24_
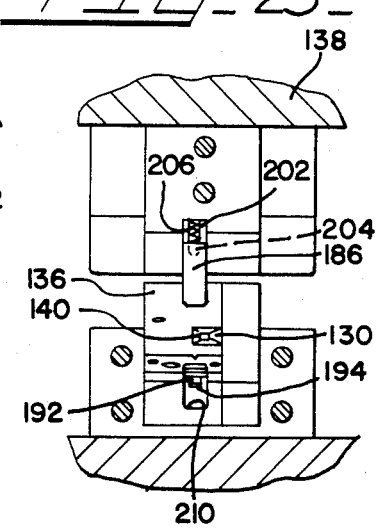
FIG_25_

APPARATUS FOR FORMING THE STITCH FORMING AREA OF A SEWING MACHINE THROAT PLATE

This application is a Continuation-In-Part of U.S. patent application Ser. No. 557,713 filed Dec. 2, 1983, abandoned, which is a divisional of Ser. No. 315,335, filed Oct. 26, 1981, now U.S. Pat. No. 4,430,878, issued Feb. 14, 1984.

FIELD OF THE INVENTION

This invention relates to sewing machines and, more particularly, to an apparatus for fabricating the stitch forming area of sewing machine throat plates.

BACKGROUND OF THE INVENTION

One of the most important areas contributing to the overall performance of a sewing machine is the stitch tongue area of the sewing machine throat plate. Because the stitch tongue area of the throat plate is intimately involved with the formation of the stitch, its concise fabrication is paramount to the overall performance of the machine. Also, to allow continued and effective use of a sewing machine in a sewing plant, throat plates must be readily replaceable. Thus, the thousands of like throat plates being produced and used every year must also be consistent to allow interchangeability.

To meet the stringent requirements of conciseness and consistency previously required tedious hours of hand labor to produce the throat plate. Even with hand worked throat plates, consistency between parts remained a difficult standard to meet. That is, one plate could vary from the next depending upon the experience and expertise of the craftsperson producing the plate. Recently, some manufacturers have turned to alloyed steels in an effort to improve the durability of the throat plates. Although alloyed steels may produce stronger throat plates, there are a number of drawbacks associated with throat plates made from alloyed steels. Alloyed steels require increased machining time to produce the desired stitch tongue. Also, alloyed steels result in increased tool wear used in forming the throat plate. Even though more durable, the requirements of consistency and conciseness are not guaranteed by using alloyed steels.

SUMMARY OF THE INVENTION

In view of the above, and in accordance with the present invention, there is provided an apparatus for forming the stitch tongue area of sewing machine throat plates with consistency and conciseness even with alloyed steels. The problem of overcoming all of the heretofore mentioned constraints is essentially solved by using a cold forming process for forming the stitch tongue. Cold forming the stitch tongue is economically attractive because it permits greatly increased productivity per worker hour. The disclosed method also saves a significant amount of time and energy compared with the heretofore known method of fabricating the throat plates.

With the present invention, a planar throat plate blank is positioned in a power press between a forming punch and a complimentary arranged die. The forming punch having a mirror image of the desired stitch tongue profile, is progressively pressed against the blank with an amount of force adequate to permanently displace the blank material in a manner such that it conforms to the punch form. The material is forced to flow into the intricacies of the punch whereby causing reorientation and elongation of the grains in a direction generally parallel to the profile of the forming punch and sets up residual compressive stresses which help to increase the strength of the stitch tongue. A suitably formed cavity in the die which may have a series of pressure points provided therein, controls the displacement of material during the swaging process. The material initially displaced into the cavity has a "dowelling effect" on the position of the plate whereby preventing lateral shifting thereof. Thus, the stitch tongue profile is located with consistency on every plate produced with this method. Because the apparatus employed for forming the stitch tongue profile has a positive stop, each plate produced has a quality of conciseness required in the stitch forming area regardless of the blank's thickness. Furthermore, this unique method of forming the stitch tongue profile is effective on a wide range of alloyed materials. Having impressed the stitch tongue profile, the blank is then sized and the appropriate number and size of needle holes and thread slots are provided therein.

The stitch tongue profile or configuration of the throat plate varies according to machine style. Some stitch tongue profiles allow the forming punch to move perpendicular to the horizontally disposed throat plate blank. Other stitch tongue profiles, however, require the forming punch to meet the blank at a predetermined angle. The workpiece slippage problems inherent with angularly impressing a punch into a workpiece are readily apparent to a skilled artesian.

A second embodiment of the instant invention provides an apparatus which permits a forming punch to meet the blank at a predetermined angle while insuring dimensional accuracy and consistency between parts. In addition to unique features offered in the first embodiment, the apparatus of the second embodiment includes a unique self positioning and locking mechanism which prevents workpiece slippage during the swaging process. Because the workpiece blanks may slightly vary in length, the holding mechanism used in combination with the second embodiment automatically compensates for the varying blank sizes.

In the second embodiment, the support platens for the punch and die are arranged in the press at correspondingly disposed angles with respect to the reciprocal path of the punch. Both the punch and die are removably secured to their respective support means. Normally, the pressing action of the punch against the blank would result in endwise displacement of the blank. With the present invention, however, and as mentioned above, means for preventing endwise displacement of the blank are provided. Such means are provided to insure dimensional accuracy and consistency between parts. In the preferred embodiment, the workpiece holding mechanism includes a self positioning member carried by the lower die platen. The self positioning member is cam activated in timed sequence with the cold forming process. The activating cam for the self positioning member automatically slides the member an extent determined by the particular blank being swaged. The cam automatically moves the sliding member into a positive abutting relationship with the lowest most end of the blank whereby preventing its endwise displacement.

There are a number of advantages which are inherent with the instant process. Cold forming is a relatively high speed process that can greatly increase production rates. The life of a die, especially if made from carbide, is usually much longer than that of cutting tools. In most cases, the power required to cold form a stitch tongue profile is less than the total power required to produce a stitch tongue profile through conventional means. A stitch tongue profile produced under the instant method exhibits improved physical properties. At the same time, the dimensional tolerances of the finished stitch tongue remain more uniform or consistent during the life of the punch and die. Moreover, this cold forming chipless machining process produces a stitch tongue having a surface quality superior to that of any hand machining operation. The surfaces produced by the instant invention are free from tears, chatter, and cutter marks that could serve as focal points for thread entanglement or material stress and, therefore, starting points for fatique failure. With the present invention, the form of the punch is faithfully and consistently produced in the workpiece. Furthermore, the profile of practically any shaped stitch tongue is easily achieved simply by changing dies. Thus, there may be less down time due to tool replacement and/or wear.

It it therefore primary object of this invention to provide an apparatus for fabricating the stitch tongue profile of a sewing machine throat plate with consistency and conciseness regardless of the material used.

Another object of this invention is to provide an apparatus for fabricating the stitch tongue area of the sewing machine throat plate more economically and with more accuracy than conventional means.

Another object of this invention is the provision of an apparatus for fabricating a stitch tongue profile quicker, cheaper and with increased strength.

Another object of this invention is to provide an apparatus capable of fabricating the stitch tongue of a sewing machine throat plate with a surface finish superior to that achieved with conventional means.

Yet another object of the present invention is to provide an apparatus for fabricating any stitch tongue profile in a sewing machine throat plate simply by switching or changing tools.

Still another object of the present invention is to provide an apparatus for cold forming the stitch tongue area of a sewing machine throat plate wherein the displacement of material is controlled in a predetermined manner whereby minimizing wasted parts.

Another object of this invention is the provision of an apparatus for forming a stitch tongue profile that can be precisely measured before extensive operations have been performed.

A further object of this invention is the provision of an apparatus capable of impressing a stitch tongue profile in a workpiece blank disposed at an angle to the reciprocal path of a forming punch.

A further oject of this invention is the provision of an apparatus capable of forming a stitch tongue profiled having a compound angle in a workpiece blank in a single operation.

Further objects and advantages of this invention will become apparent from the description now to follow and shown by way of example in the accompanying drawings, in which.

Figure 2:
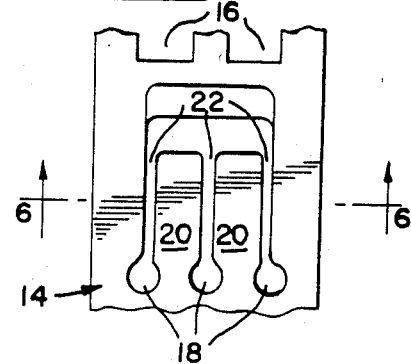
FIG. 2 is an enlarged top plan view of the stitch forming area of the throat plate shown in FIG. 1.
Figure 3:
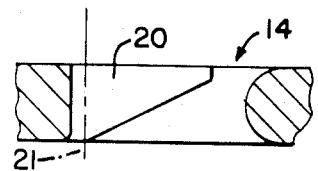
Figure 4:
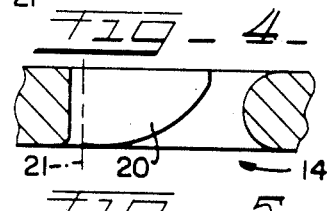
Figure 5:
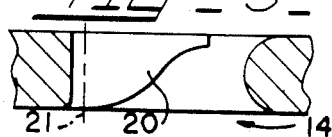
Figure 6:
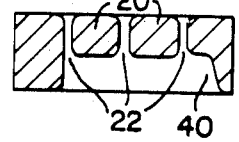
Figure 21:
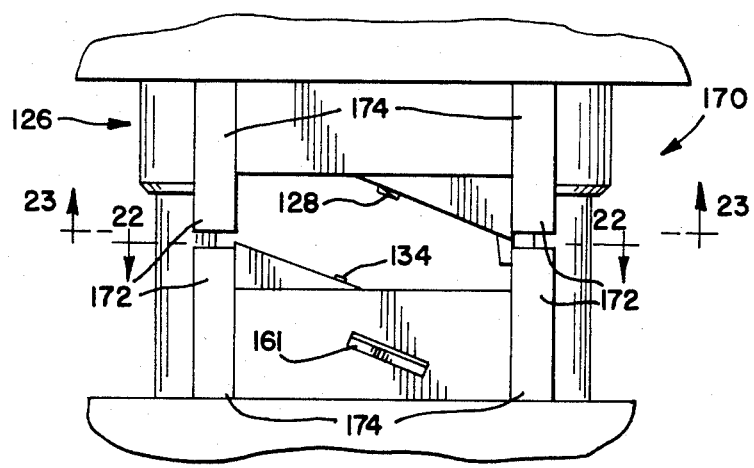
Figure 22:
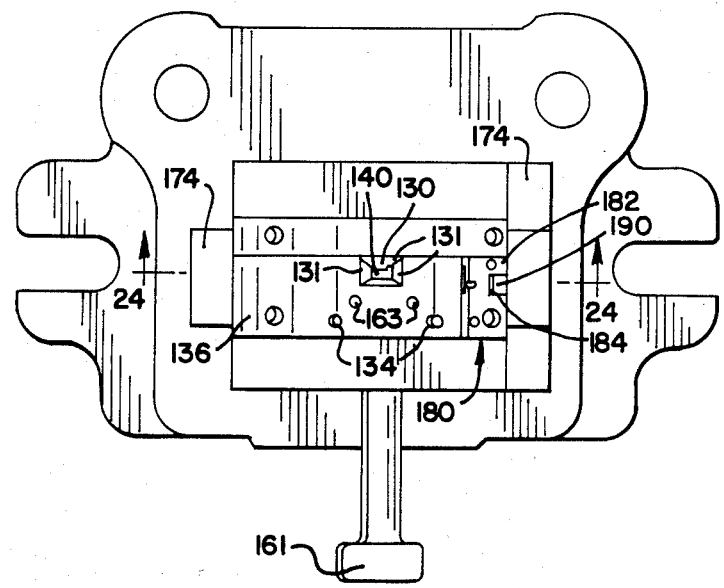

FIGS. 3, 4, and 5 illustrate a few of the stitch tongue profiles which can be achieved with the instant apparatus;

FIG. 6 is a sectional view taken along Line 6—6 of FIG. 2;

FIG. 7 is a partial sectional view of a power press provided with a first embodiment of the present invention;

FIG. 8 is a partial sectional end view of FIG. 7;

FIG. 9 is a partial top plan view of the die assembly of the first embodiment;

FIG. 10 is a bottom plan view of a forming punch assembly;

FIG. 11 is a side elevational view of a type of forming punch used with the present invention;

FIG. 12 is another side elevational view of the forming punch illustrated in FIG. 11;

FIG. 13 is a front elevational view of the forming punch illustrated in FIG. 11;

FIG. 14 is an exploded perspective view of a forming punch comprised of a plurality of parts;

FIG. 15 is a top plan view of one type of die used in conjunction with the above illustrated punch;

FIG. 16 is a view similar to FIG. 15 but shows a different die;

FIG. 17 is a sectional view taken along line 17—17 of FIG. 16;

FIG. 18 illustrates a top plan view of an overedge sewing machine throat plate capable of being produced by the instant invention;

FIG. 19 is a right side elevational view of the throat plate shown in FIG. 18;

FIG. 20 is a perspective view of the stitch tongue profile of the sewing machine throat plate shown in FIG. 18 taken from beneath the throat plate;

FIG. 21 illustrates a side view of a power press provided with a second embodiment of the present invention;

FIG. 22 is a partial plan view taken along Line 22—22 of FIG. 21;

FIG. 23 is a partial plan view taken along Line 23—23 of FIG. 21;

FIG. 24 is a partial sectional view taken along Line 24—24 of FIG. 22;

FIG. 25 is a partial sectional view taken along Line 25—25 of FIG. 24;

FIG. 26 is a enlarged sectional view illustrating the mechanism for preventing endwise displacement of a blank during the cold forming process; and FIG. 27 is a perspective view illustrating a punch capable of forming a stitch tongue profile having a compound angle in a single operation.

DETAILED DESCRIPTION OF THE INVENTION

Figure 1:
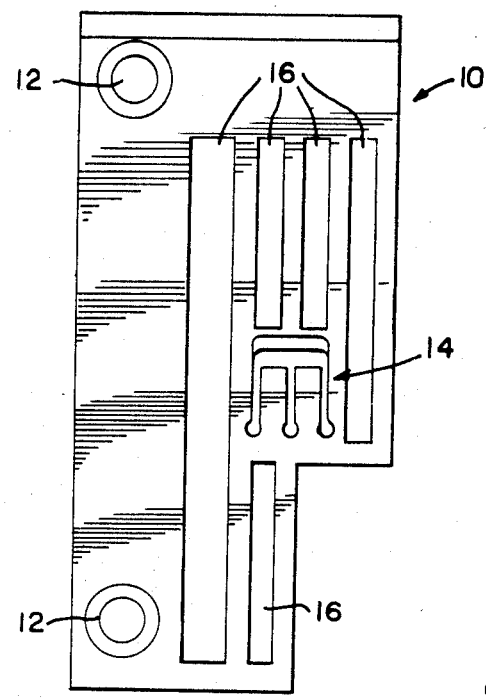
FIG. 1 is a top plan view of a flatbed sewing machine throat plate capable of being produced by the instant invention.

Referring now to the drawings, wherein like reference numerals indicate like parts throughout the several views, illustrated in FIG. 1 is a stitch plate or throat plate 10. The illustrated throat plate is one that finds use with flatbed sewing machines. As will be discussed hereinafter, the teachings herein advanced are equally applicable to other throat plates as well. Suffice it to say, a flat bed type throat plate 10 is a generally planar body having apertures 12 permitting attachment of the throat plate to a machine bed, a stitch forming area 14 and appropriate feed dog slots 16.

The present invention is primarily concerned with the formation of the stitch forming area 14. As best illustrated in FIG. 2, the stitch forming area of the illustrated throat plate may include one or more needle holes 18 permitting endwise reciprocation of one or more needles (not shown) through the plate, one or more stitch forming fingers 20, and two or more thread slots 22 extending from the needle holes 18. As a skilled artesian readily appreciates, the stitch forming fingers are extremely important to the overall performance of the sewing machine. The configuration of the stitch forming fingers may take a variety of profiles. It is consistency, however, between the parts which is important to insure maximum performance of the sewing machine. As illustrated in FIGS. 3, 4 or 5, respectfully, the stitch forming fingers or tongues for a flatbed type throat plate may depend from one planar surface of the blank at a premeasured angular constant, have an arcuate configuration, or be represented by two inversely related curves. The form or configuration of the stitch tongue is determined by the desired stitch appearance. The desired stitch length is also a determining factor in the formation of the stitch tongue. That is, the length of the stitch tongue, defined by the distance between the center line, generally indicated as 21, and the stitch tongue's distal end, also contributes to the stitch appearance and length. Because the stitch tongue and associated structure is such a critical area in the overall performance of the sewing machine and development of a satisfactory stitch, the present invention describes a unique apparatus for forming same.

The following describes one method of forming the stitch forming area of a sewing machine throat plate. First, the apertures or screw holes 12 are provided in a throat plate blank. As illustrated in FIGS. 7 and 8, the blank 24 is then located in a power press 26. The power press employed for this operation must be capable of developing progressively increasing pressures up to a limit approximating 25 tons. An Interpac power press, Model IPE-2560, is one example of this type of press. The blank 24 is located in the press between a cooperatively arranged punch 28 and die 30 defining a die or set assembly 32. The blank is positioned in the press by fitting the apertured plate or blank 24 over two nonload bearing projection pins 34 carried by the lower press platen 36. Having situated the blank in the press, the forming punch 28, which in the preferred embodiment is carried by the press ram 38 (FIG. 8), is then urged toward the die 30 whereby squeezing or swaging the blank therebetween. The forming punch 28 has a mirror image of the stitch tongue profile and is urged against one planar face of the throat plate blank with progressively increasing levels of pressure eventually exceeding the yield strength of the blank material and ultimately resulting in a plastic flow of material. When the forming punch 28 penetrates the blank, material flows around the form of the punch. This causes reorientation and elongation of the grains in the direction of the deformation forces whereby increasing the strength of the stitch tongue. That is, the grain structure assumes a direction of flow extending generally parallel with the profile of the forming punch thus creating less end grain which, of course, adds to the strength of the stitch tongue. In the initial stages of the swaging process, and as a result of the forming punch's pressing action on one planar face of the blank, material is displaced from the blank's opposite face. In the punch and die arrangement of the first embodiment, the material that is displaced from the opposite planar face of the blank is restrained in a predetermined unique manner. That is, all of the displaced material on the face of the blank opposite the forming punch flows or is urged into a specifically configured stepped cavity 40 provided in the die 30. As described below, pressure points within the cavity 40 act on the plastically deformed material to control its flow whereby aiding in the formation of the stitch tongue and avoiding die break or fracturing of the material along its edges during the swaging process. The material initially displaced into the cavity also serves to lock or prevent sideway shifting of the blank relative to the die assembly 32. Because the blank is initially locked against movement, accurate and consistent location or placement of the stitch tongue profile relative to the screw holes 12 is achieved. Also, initial locking of the plate against movement avoids shearing of the pins 34 over which the blank is fitted.

The progressive urging of the forming punch against the blank continues until a positive stop occurs between the face of the upper punch platen 42 carrying the forming punch 28 and the upper planar face of the blank. Because a positive stop is provided, a concise stitch tongue profile will be impressed in the blank regardless of the blank's thickness. As a result of this cold forming process, the metal is forced to flow into all of the interstices of the forming punch and the mirror image thereof is impressed into the throat plate blank. In the ultimate stages of the forming process, the punch and die cooperate to normalize the stress points around the extersion whereby aiding and preventing warpage of the plate. Having once removed the plate from the press, a guage or other measuring means can be used to determine the preciseness of the stitch tongue profile. In this manner, the configuration of the stitch tongue profile can be precisely measured before extensive operations are performed on the plate.

Having once impressed the stitch tongue profile into the throat plate blank, the blank is then restored or returned to its generally planar condition. That is, the displaced material, having a step like configuration, which was urged into the cavity is removed. In this same operation, the plate is sized to a predetermined dimension. It may be desirious, depending on the throat plate material chosen, to anneal the blank prior to removing the displaced material. The annealing process sufficing to soften those areas work hardened by the cold forming process. Having once returned the blank to its generally planar configuation, the plate is then turned over and sized a second time to another predetermined dimension.

After sizing the plate the second time, the required number and appropriately sized needle holes or openings 18 and thread slots 22 are machined or formed in the blank in the area of the stitch tongues. Thus, the stitch forming area of the sewing machine throat plate has been completed.

Other advantages may also be acquired by using this method of machining the stitch forming area. As best illustrated in FIG. 6, the underside of the flatbed throat plate is provided with a clearance. This clearance is generally indicated by reference numeral 40 in FIG. 6. This clearance allows for proper formation of the stitch triangle during the stitch forming process. To machine this area on the hard steels, usually used for throat plates, results in expensive tool wear. Also, the rotary cutter normally used to provide this clearance does not always provide sufficient clearance thus further hand operations are required to accomplish the desired results. With the present invention, however, this area may be completely formed during the swaging process whereby providing a smooth surface furnish and eliminating further machining and/or hand operations. Forming this area during the cold forming process also provides, if desired, maximum clearance across the entire width of the stitch forming area, a result unobtainable by using the rotary cutter, whereby the ultimate in sewing performance can be accomplished.

As mentioned, the die assembly 32 used in the above described method includes a forming punch 28 and a die 30. The forming punch 28, depending upon the profile of the stitch tongue, may be of unitary construction or be assemblage of a plurality of elements. For example, a forming punch capable of providing a stitch tongue profile having a constant angular orientation as seen in FIG. 3, may be of unitary construction. In contrast, and as best seen in FIG. 14, a forming punch used for impressing a curved stitch tongue profile, as seen in FIGS. 4 or 5, or one wherein increased thread handling room may be required on the underside of the plate, may be comprised of two or more complementary elements 29 and 31. It is also possible to form or mold the punch and the die from a carbide type material whereby further extending the punch and die life. Operator controlled workpiece removal means 61 including ejection pin means 63 (FIG. 9) are provided to remove the throat plate blank from the die assembly 32.

Turning again to FIGS. 7 and 8, regardless of the die's construction, the forming punch 28 of the present invention is removably secured in a cavity 44 formed in the punch platen 42. As additionally seen in FIGS. 11 through 13, the forming punch is comprised of a punch block 46 having a forming section 48 projecting from one end and a sideways projecting key or lip 50 formed at the opposite end. The forming section 48 includes a shearing surface 49 and a stitch tongue profile surface 51 that extends away from the surface 49 and is a mirror image of the desired stitch tongue profile. The key or lip 50 coacts with a keyway 52 (FIG. 8) formed in the punch platen 42 and serves to removably secure the punch against endwise movement. The key 50 also prevents erroneous insertion of the punch 28 into the platen. As described above, the forming section of the punch has a profile corresponding to a mirror image of the desired stitch tongue profile. Depending on the desired result, the forming section of the punch may also include an angular offset section 54 which may be formed as part of the punch or as a seperate piece (FIG. 14). In either the unitary or multiple piece construction, the angular offset portion preferably extends the width of the forming punch. In the swaging process, this offset portion forms the angular surface 40 on the blank whereby providing additional thread clearance in the blank.

The end surfaces 55 surrounding the forming section 48 are bevelled away from the forming section in a generally diamond-like configuration. Each bevelled surface extends away from a high point on the punch, indicated at 58 in FIGS. 11 through 13 whereat the punch block and forming section meet, to a peripheral low point indicated at 60. When assembled in the punch platen, the low point on the bevelled surface meets with the exposed planar face of the punch platen 42. The total amount of the slope approximates 0.004" to 0.007". The forming punch is so designed that in addition to the impression left by the forming section, a diamond-like configuration surrounding the impressed stitch tongue profile is impressed into the stamped blank in the ultimate stages of the swaging process. This impression relieves the bending stresses created during the swaging process whereby aiding and preventing warpage of the blank.

Preferably, the stationary die 30 is of unitary construction and is removably secured in the stationary die platen 36 of the press. As seen in FIG. 8, the die 30 is comprised of a die block 76 having a sideways projecting key or lip 78. The key 78 coacts with a keyway 80 formed in the die platen 36 and serves to removably secured the die against endwise movement. As with the punch, the key 78 prevents erroneous insertion of the die into its die platen. The die 30 includes a centrally arranged cavity or opening 40 that cooperates with the forming punch in the formation of the stitch tongue profile. Configuration of the die cavity depends on the stitch tongue being produced. But, in general, the die cavity measures approximately 80° of the surface area of the depending forming section on the forming punch. The cavity in the die serves several purposes: it takes the material displaced during the swaging process; it serves to prevent lateral shifting of the blank during the swaging process; and, it adds to the formation of the stitch tongue.

As may be best seen in FIGS. 15 and 16, the die for the first embodiment includes a cavity 40 which is formed with a series of steps 64 and 66. The provision of steps in the die cavity aids in the proper formation of some stitch tongue profiles. The steps in the cavity act as pressure points during the swaging process and without these pressure points, the displaced material may shear and create a die break around the edges of the material. Instead, the pressure points or steps provided by the instant invention control the material flow by holding up and restraining the plastic flow of material whereby preventing fracturing or stress breakage during the forming process and aid in allowing the material to meet the profile of the impressing punch.

During the swaging process, the first step 64 in the cavity 40 serves to hold and prevent lateral or horizontal shifting of the blank. That is, as the forming punch cause displacement of material along the bottom surface of the plate, the displaced material begins to fill the area defined by the step 64. The material displaced into this step portion has a "dowelling effect" which holds the part in place and prevents lateral displacement of same. As is appreciated, the step 64 prevents the plate from shifting in three directions. The shearing face 49 (FIGS. 11 and 13) on the forming punch 28, once imprssed into the blank during the swaging process, prevents the plate from shifting in the fourth direction. Thus, the plate is prevented from shifting in any lateral or horizontal direction during the cold forming process. Once the displaced material fills the void defined by the first step 64, and with increasing pressure from above, the material's plastic deformation eventually overcomes the resistence offered by the first step or pressure point. Having overcome the resistance offered by the first step, the material then flows into the second step 66 of the cavity 40. Even as the plastically deformed material flows past the pressure point 64, resistence to the flow will be presented to allow formation of stitch tongue profile.

As mentioned above, configuration of the bottom die cavity may include a number of pressure points or steps depending on the stitch tongue being produced. Although all of the dies used under the teachings of this present invention will incorporate the concept of using some type of pressure points or steps in the cavity, the design of the cavity 40 may vary. As shown in FIG. 16, further relief means or steps may be required. An example of where such a die is required might be a throat plate where the stitch tongue forming punch has two intersecting generally perpendicular walls. In such an instance, further relief means or cuts generally indicated in FIG. 16 by reference numeral 70, may be needed in the cavity to allow proper plastic flow. Without these additional pressure relief means, the displaced material may not be properly supported thus resulting in fracturing of the material. In some instances, a second relief means 72 may be provided to allow adequate support for the displaced material without causing damage to the forming punch during the swaging process. As mentioned, the number of relief means or pressure points required is a function of the intricacies of the punch used in forming the stitch tongue profile.

Regardless of the number of relief means provided, the exposed end of the die 30 may be provided with bevelled edges 83 (FIGS. 9 and 17), similar to those provided on the punch 28. That is, a series of four bevelled edges or surfaces extend away from the cavity formed in the die. Each bevel extends away from a high point, indicated at 84 to a perpherial low point indicated at 86. When assembled in the die platen, the lower point 86 meets with the exposed planar face of the die platen 36. The total amount of slope approximates 0.004" to 0.007". Again, as with the punch 28, the die is so designed such that a diamond-like configuration is impressed into the blank in the ultimate stages of the swaging process. This impression, along with that impression left by the punch 28 serves to relieve the bending stresses created during the swaging process whereby aiding and preventing warpage of the blank.

As mentioned above, this method for forming a stitch tongue profile requires high pressures. As best seen in FIGS. 7 through 10, to maintain a constant sliding cooperative relationship between the punch and the die, in addition to the normal means 90 additional guide means 92 have been provided, The guide means 92 comprise a series of supports 94 which are provided about the die platen 36. The guide means 94 extend upwardly above the die platen and define an area into which the punch platen 42 is adapted to be fitted. In operation, when the forming punch is urged toward the die, the punch platen carrying same cooperates with the guide means to guide the punch and die in a constant sliding cooperative relationship relative one another. Thus, the high pressures incurred with the present invention have no adverse effect concerning the relationship between the punch and die.

As mentioned above, the configuration of throat plates vary according to machine style. FIGS. 1 through 6 illustrate a throat plate used in a flatbed sewing machine while FIGS. 18 through 20 illustrate a type of throat plate 110 common to overedge sewing machines. The throat plate 110 has a generally planar body provided with one or more apertures 112 permitting attachment of the plate to a machine bed, a stitch forming area 114 and appropriate feed dog slots 116. The stitch forming area of an overedge throat plate includes one or more needle holes 118 permitting endwise reciprocal movement of one or more needles (not shown) through the plate, a stitch forming finger 120 about which a chainstitch may be formed and a thread cast off area 121. As with other throat plates, the stitch forming finger 120 is extremely important to the overall performance of the machine. As best illustrated in FIGS. 19 and 20, the stitch forming finger 120 of an overedge throat plate is usually formed with a compound angle. That is, surface 123 is angled in a first lengthwise direction extending from a location proximate the needle hole 118 to another location at the distal end 125 of the stitch tongue and is also angled in a second sidewise direction extending from one side 127 of the stitch tongue to the other side 129 of the stitch tongue. The thread cast off area 121 is disposed at the distal end of the stitch tongue. The thread cast off area 121 includes an inclined thread guiding surface 131. The lower most edge 133 of the inclined surface 131 underlies and is forward of the distal end 125 of the stitch tongue 120. By such design, when a thread chain is released from the finger 120 the inclined surface 131 aids the thread chain in properly moving with the garmet workpiece and will prevent entanglement of the thread chain with the feed mechanism normally disposed beneath the throat plate.

Although such a design is beneficial, heretofore it has been extremely difficult to fabricate. As a skilled artesian will readily appreciate, a normal rotating cutter or mill would not and could not provide both the desired compound angle and a desirable thread cast off area as described above. Instead, a dovetailed cutter coupled with extensive hand labor operations were required to achieve the desired result. As mentioned above, however, inconsistency between parts is inherent with hand finishing operations. Now, the apparatus disclosed in this second embodiment of the present invention permits fabrication of overedge throat plates in a cost effective and unique manner.

The following describes a method for fabricating such overedge throat plates. First, two apertures or screw holes 112 are provided in a throat plate blank. As illustrated in FIG. 24, the blank 124 is then located in a power press 126 between a cooperatively arranged punch 128 and die 130 defining a die set assembly. The power press may be of the type described above with respect to the first embodiment of the present invention. Arrangement of the blank in the press is effected by fitting the apertured plate or blank 124 over two non-load bearing projecting pins 134 carried by the lower press platen 136.

As illustrated in FIGS. 21 and 24, the support means including the lower and upper press platens, 136 and 142 respectively, for the die and punch are angularly disposed with respect to the vertical reciprocal path of the press ram 138. Accordingly, a blank located in the press is arranged at an angular disposition relative to the path of the punch 128. Preferably, the angular disposition of the blank relative to the reciprocal path of the punch is in the range of 70° to 80°.

As mentioned, the die assembly includes a forming punch 128 and die 130. As best illustrated in FIG. 27, the forming punch 128 is provided with a mirror image of the stitch tongue profile that is to be impressed or swaged into the blank. The punch is so designed to impress a compound angle into the blank in a single swaging operation. Moreover, the punch is designed such that the entire length of the stitch tongue is completed during the swaging process wherein providing a smooth surface finish. Because the punch approaches the blank at an angle, the distal end of the stitch tongue is initially formed at a location which underlies and is forward of the lowermost edge of the incline surface 131. The die 130 is provided with a recess or cavity 140 into which material displaced during the swaging process flows.

Both the punch and die 128 and 130 are each removably secured to their respective support means in a manner similar to the punch and die arrangement of the first embodiment. That is, each of the punch and die means are provided with a projecting key which is adapted to fit into a key way formed in the platen supporting same. As shown in FIGS. 21 and 22, operator controlled workpiece removal means 161 including ejecting pin means 163 are provided to remove the throat plate blank from between the die assembly. The exposed end of die 130 may be provided with beveled edges or surfaces 131 similar to those provided on die 30 of the first embodiment. As with die 30, the diamond-like configuration is impressed into the blank in the ultimate stages of the swaging process. This impression, serves to relieve the bending stresses created during the swaging process whereby aiding and preventing warpage of the blank 124. As mentioned above, the method used for forming the stitch tongue profile requires high pressures. As best seen in FIGS. 21 through 25, to maintain a constant sliding cooperative relationship between the punch and die 128 and 130, in addition to the normal guide means 170 additional guide means 172 have been provided. The guide means 172 comprise a series of supports 174 which are provided about the die platens 136 and 142. Some portion of each of the guide means extend upwardly above the platens and define an area into which the other platen is adapted to be fitted. In operation, when the forming punch is urged toward the die, the punch platen carrying the support means cooperates with the supporting means on the lowermost platen to guide the punch and die in a constant sliding relationship relative one another. Thus, the high pressures incurred with the present invention have no adverse effect concerning the relationship between the punch and die.

Because of the angular disposition of the support means, the blank 124 situated therebetween has a tendency to move endwise during the swaging process. As a skilled artesian will appreciate, the tendency of the blank 124 is to move downward in reaction to the pressure of the swaging process. Accordingly, the present invention is provided with a self compensating locking means 180 for preventing endwise displacement of the blank during the swaging process. The self compensating locking means 180 is best illustrated in FIG. 26. The self locking means includes a unique combination of elements including a housing 182, a tool 184 slidably arranged and guided in the housing and a camming member 186. The housing 182 is secured to the platen 136 proximate the lowermost end of the blank 124 by suitable fasteners. The housing 182 is provided with a slot 190. The tool 184 is adapted for reciprocal movement relative to the housing under the influence of the camming member 186. A pin 192 depends from one end of the tool. The free end of the pin 192 is accommodated in a slot 194 to guide the tool along a linear path of travel. An upstruck pin 196 projects from the other end of the tool and is accommodated in a slot 198 provided in the housing 182. A resilient member 200, preferably a spring, is disposed between the limits of the slot 194 and the pin 192 and serves to urge the tool to the right as shown in FIG. 26. The length of the tool 196 projects slightly beyond the slot 190 provided in the housing 182. The tool 184 is moved to the right to the extent allowed by the limits of the slot 198. The cam member 186 is carried by the upper support means or platen 142. The camming member 186 is carried in a recess 201 provided in the platen 142 and is guiding therein by the support 174 secured to one end thereof. At its upper end, the camming member 186 is provided with a resilient member or spring 202 and a projection or pin 204. The pin 204 is accommodated in a slot or groove 206 in a manner whereby the member 186 is linearly guided and is also limited in its extent of travel. The spring 202 serves to urge the member 186 downward to the extent permitted by the pin and groove 204 and 206 arrangement. At its other end, the member 186 is provided with a camming surface 208 which is tapered in a direction extending in an acute angle relative to the longitudinal axis of the camming member 186. Preferably, the angle measures approximately 7° relative the longitudinally axis of the member.

In operation, the self positioning member or tool 184 is cam actuated in timed sequence with the cold forming process. That is, as the upper platen 142 is moved toward the blank 124, the free end of the camming member 186 penetrates the slot 190 provided in the housing 182 and moves within a recess 210 provided in the lower press platen 136. The camming surface 208 of the member 186 serves to forcibly urge the free end of the tool 184 toward the lowermost end of the throat plate blank. Continued downward movement of the support means 142 causes the camming surface to continuely urge the tool whereby forcibly and automatically displacing the tool 184 in a linear direction toward the blank 124. The tool 184 forcibly moves toward the blank until the end thereof abuts the lowermost end of the blank. Thereafter, the resilient member 200 compensates for the continued movement of the support means 142 toward the blank. In this manner, the tool 184 is moved toward the blank 124 an extent determined by the particular size of the blank being cold formed. The positive displacement of the tool by the cam coupled with the abutting action of the tool against the blank prevents endwise displacement of the blank during the cold forming process. Having secured the blank against endwise displacement, the high pressures created during the swaging process may be effected thus impressing the stitch tongue profile with dimensional consistency and accuracy.

The progressive urging of the forming punch against the blank continues until a positive stop occurs between the face of the punch platen 142 and the upper planar face of the blank. Because a positive stop is provided a concise stitch tongue profile will be impressed in the blank regardless of the blank's thickness. As a result of this cold forming process, the metal is forced to flow into all of the interstices of the forming punch and a mirror image thereof is impressed into the throat plate blank.

Having once impressed the stitch tongue profile into the throat plate blank, the blank is then restored or returned to its generally planar condition. That is, the displaced material which was urged into the cavity in the die is removed. In the same operation, the plate is sized to a predetermined dimension.

After sizing the plate, the thread castoff area 121 is prepared. That is, an angularly disposed saw cuts through the blank at the distal end of the stitch tongue whereby providing the necessary thread clearances which simultaneously provides the inclined surface 131. Thereafter, appropriately sized needle holes or openings 118 and thread slots are machined or formed in the blank. Thus, the stitch forming area of the sewing machine throat plate has been completed.

Thus, it is apparent that there has been provided, in accordance with the present invention, an Apparatus For Forming The Stitch Forming Area Of A Sewing Machine Throat Plate that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claim.

Having adequately described our invention, what we claim is:

1. An apparatus used in swaging a stitch tongue profile in a sewing machine throat plate blank, comprising:
   a power press having an operative end movable relative to a base and having means to drive said press so as to develop progressively increased pressures during swaging, said operative end being movable along an axis;
   a first support means having a workpiece contacting surface secured to said operative end of said power press for reciprocal movement therewith, said workpiece contacting surface being obliquely oriented relative to said axis;
   a forming punch secured to said first support means, said forming punch including a male segment having a configuration which is a mirror image of that required for the stitch tongue profile;
   a second support means having a workpiece contacting surface disposed on said power press base, said workpiece contacting surface of said second support means oriented at an angular disposition corresponding to that of said first support means;
   a die secured to said second support means, said die having a cavity dimensioned to lock in the throat plate blank and to control the displacement of material created when said forming punch is pressed against said blank with increasing pressure;
   self compensating means for preventing endwise displacement of said blank during the swaging process, said self compensating means includes a camming member movably coupled to one of said first and second support means relative thereto and along a path generally parallel to said axis, a tool slidably mounted on the workpiece contacting surface of the other of said first and second support means, said tool being disposed proximate one end of said located throat plate blank on said workpiece contacting surface of said second support means, said camming means forcibly urging said tool along its respective workpiece contacting surface when said first support means moves towards said second support means; and
   means for maintaining a consistent sliding relationship between said punch and die.

* * * * *